United States Patent Office 3,215,922
Patented Nov. 2, 1965

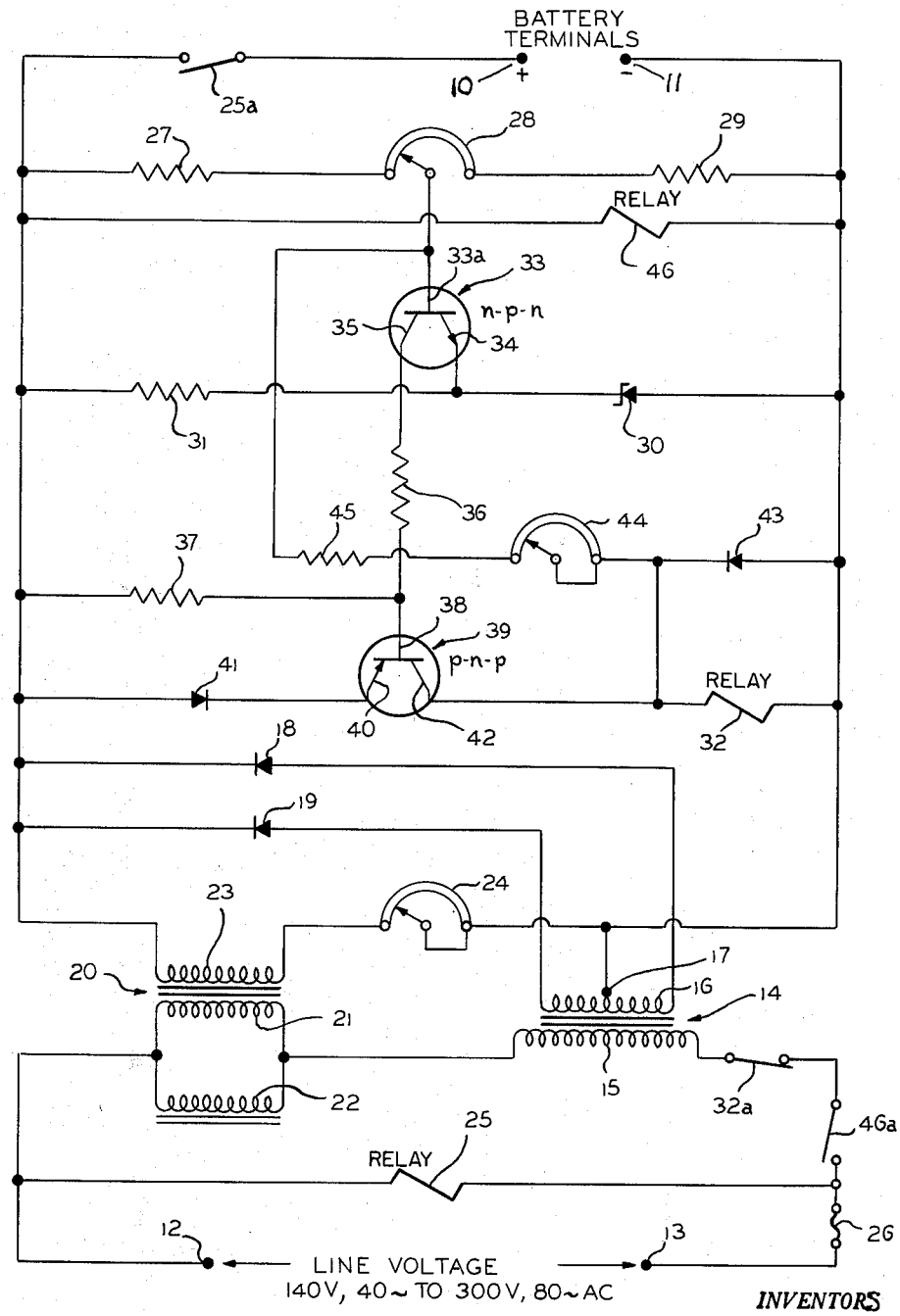

3,215,922
BATTERY CHARGER
Robert M. Olsen, Villa Park, Ill., and Joseph A. Christ, Los Angeles, Calif., assignors to Vapor Corporation, Chicago, Ill., a corporation of Delaware
Filed May 31, 1962, Ser. No. 198,905
8 Claims. (Cl. 320—40)

This invention relates in general to battery chargers, and more particularly to a pulsing battery charger for providing a reliable and efficient method of charging nickel-cadmium batteries, although other uses and purposes may be apparent to one skilled in the art.

The battery charger of the present invention is capable of producing a steady direct current output from a varying alternating current voltage input. The circuitry of the battery charger primarily uses selenium rectifiers, diodes, transistors, resistors, potentiometers, a transformer, and a saturable reactor. Accordingly, inasmuch as no vacuum tubes are employed, the battery charger can withstand much shock and vibration.

Therefore it is an object of the present invention to provide an improved battery charger capable of producing a steady direct current output from a varying alternating current input which is reliable and efficient and capable of withstanding much shock and vibration.

Another object of this invention is to provide a battery charger wherein the charger secondary or charging circuit will be automatically broken to prevent battery drain when the primary power cuts off.

Still another object of this invention resides in the provision of a pulse type battery charger where the capacity of the system is modulated by cycling the time base.

A further object of this invention is to provide a battery charger having a current limiting reactor which effectively holds the average current through the primary of the transformer constant, thus keeping the average charging current relatively constant throughout the operating range.

A still further object of this invention is to provide a pulsing battery charger capable of comparing the terminal voltage of a battery being charged to some standard, wherein if the voltage drops to or below this standard by a predetermined amount, the charger is cut in, and when the charging current builds the voltage up to or above the standard by a determined amount, the charger is cut off.

A further object of this invention is to provide a pulsing battery charger especially useful for charging nickel-cadmium batteries, wherein sufficient "off" time is provided when the battery is fully charged to allow the catalyst to do its work of recombining the electrolyzed gases back into water, thus avoiding the loss of water and other tribulations of overcharging.

Other objects, features and advantages of the invention will be apparent from the following detailed disclosure taken in conjunction with the accompanying sheet of drawing including the single figure which is a schematic view of a battery charger embodying the invention.

Referring to the drawing, rectified current is supplied to a battery connected across the plus and minus or positive and negative battery terminals 10 and 11 from an alternating current supply source connected across line terminals 12 and 13 through a circuit comprising a transformer 14 having a primary winding 15 and a secondary winding 16. The midpoint of the secondary windings 16 is provided with a tap 17.

Rectifying elements 18 and 19, preferably selenium power rectifiers, are provided between the ends of the secondary windings 16 and the plus battery terminal 10, while the tap 17 is connected to the minus battery terminal 11, thereby providing full-wave rectification.

A current limiting saturable reactor 20, having load windings 21 and 22 arranged between the line voltage terminal 12 and one side of the primary winding 15 of the transformer and a control winding 23 connected between the plus battery terminal 10 and one side of a potentiometer 24 which has its other side connected to the tap 17, serves to effectively hold the average current through the primary of the transformer constant where a variable alternating current input is provided across the line voltage terminals 12 and 13. The potentiometer 24 serves to adjust the charging current according to the desires of the particular application. The saturable reactor 20 may be eliminated where a constant source of voltage is obtainable, along with suitable change in the transformer primary winding.

A relay 25 is provided in the alternating current input circuit to control contacts 25a in the battery charger or direct current output circuit so as to open or break the battery charging circuit when no alternating current is being applied across the line voltage terminals 12 and 13 to thereby prevent battery drain. When alternating current is applied across the line voltage terminals, the relay 25 will be energized thereby closing the contacts 25a and the direct current output circuit. Also provided in the alternating current input circuit is an overload fuse 26.

A first shunt current path is provided across the battery terminals 10 and 11 and includes a resistor 27, a potentiometer 28, and a resistor 29, all in series. A second shunt current path extends across the battery terminals and includes a Zener reference diode 30 and a resistor 31. The elements 27, 28, 29, 30 and 31 comprise a voltage sensitive bridge network which develops a signal voltage between the variable tap of the potentiometer 28 and the common terminal of the Zener diode 30 and the resistor 31, the polarity and magnitude of which is responsive to the terminal voltage of the battery. Potentiometer 28 permits an adjustment of the battery terminal voltage which when compared with the reference voltage which exists across the Zener diode 30 results in a bridge unbalance of a given polarity and magnitude.

A transistor 33 of the n-p-n type is provided in the electronic network and has a base 33a connected to the variable tap of the potentiometer 28, an emitter 34 connected to the common terminal of the Zener diode 30 and the resistor 31, and a collector 35 connected to a resistor 36. The resistor 36 is in turn connected to the common terminal of a resistor 37 and a base 38 of a second transistor 39, while the resistor 37 is in turn connected to the plus battery terminal 10. The transistor 39 is of the p-n-p type and also includes an emitter 40 connected through a diode 41 to the positive battery terminal 10, and a collector 42 connected to a common terminal of a relay 32 having contacts 32a arranged in the alternating current input circuit, a blocking diode 43, and a potentiometer 44. The potentiometer 44 is in turn connected through a resistor 45 to the common terminal of the base 33a of the transistor 33 and the variable tap of potentiometer 28, while the diode 43 is connected to the negative battery terminal.

The elements 33, 36, 37, 39, 41, 44 and 45 comprise a bi-stable trigger circuit, which provides a means of maintaining relay 32 in a completely energized or completely deenergized state in accordance with the polarity and magnitude of the signal voltage which exists between the variable tap of potentiometer 28 and the common terminal of the Zener diode 30 and the resistor 31. Potentiometer 44 provides a means of adjusting the differential between the on and off states of the trigger circuit for a given change of signal voltage. The contacts 32a of relay 32 are arranged in the alternating current input circuit so that they are open when relay 32 is energized and closed when it is deenergized.

Inasmuch as the application of line voltage to the alternating current input circuit prior to connection of a battery across the battery terminals 10 and 11 would cause rapid cycling of the relay 32 and possibly damage same, a safety relay 46 is provided having contacts 46a for closing the alternating current input circuit after a battery has been connected to the terminals 10 and 11. The battery will energize the relay 46 to close the contacts 46a.

In operation, a line voltage may be applied across the terminals 12 and 13 thereby energizing the relay 25 in the alternating current input circuit and closing contacts 25a in the charger output circuit. Thereafter, a battery may be connected across the terminals 10 and 11 thereby energizing the relay 46 and closing contacts 46a in the alternating current input circuit. Assuming that the battery terminal voltage is below the predetermined cut-off level and that the charger is in the "on" condition, the voltage between the negative battery terminal and the variable tap on the potentiometer 28 is less than the reference voltage causing transistor 33 to be reverse biased, in which state it is non-conducting. Transistor 39 is reverse biased by means of resistor 37 which makes the potential of the base 38 equal to that of the positive battery terminal and diode 41 which provides a small negative bias for the emitter 40. The feedback loop consisting of potentiometer 44 and resistor 45 in series provides an additional signal to the base of transistor 33 of negative polarity which tends to maintain the trigger circuit in the cut-off state. In this condition relay 32 is deenergized, contacts 32a are closed and the charger is delivering full charging current to the battery through the saturable reactor, transformer, and rectifiers. As the battery voltage increases to a predetermined level, the voltage between the negative battery terminal and the variable tap on the potentiometer 28 exceeds the reference voltage causing the base 33a of transistor 33 to become positive with respect to the emitter 34 by an amount sufficient to initiate conduction of current between the emitter 34 and collector 35 of transistor 33 through a circuit completed by resistors 36 and 37, Zener diode 30, and the battery. The current through resistor 37 results in a voltage drop which causes the base 38 of transistor 39 to become negative with respect to the positive battery terminal by an amount sufficient to forward bias transistor 39 and initiate conduction between the emitter 40 and the collector 42 through a circuit completed by diode 41, relay 32, and the battery. As conduction through the branch consisting of diode 41, transistor 39, and the relay 32 increases, the collector 42 becomes increasingly positive with respect to the negative battery terminal. A signal corresponding to the positive going voltage at the collector 42 is applied to the base 33a of transistor 33 by means of the feed-back loop consisting of potentiometer 44 and resistor 45. The feed-back signal being of the same sense as the signal due to the battery condition results in a rapid increase in relay current until a condition is reached where both transistors are in a full conducting state. In this condition, relay 32 is energized, contacts 32a are open and the charger is in the "off" portion of its cycle. When the battery terminal voltage falls to a predetermined level, the voltage sensing circuit initiates the triggering of the transistor switch to its opposite state which causes relay 32 to become deenergized, closing contacts 32a, thus energizing the alternating current input circuit which in turn energizes the direct current output circuit to provide the full battery charging rate.

The "on-off" cycling rate of the battery charger will depend upon the level of the battery charge and the load on the battery. For example, if the battery is fully charged with no load, the charger will have a short "on" cycle and a long "off" cyle. But if the battery charge level is very low and there is a load on the battery, the charger "on" cycle will be very long and the charger will remain on until the battery becomes fully charged before the charger will cycle off.

The pulse system employed in the present invention combines the advantages of constant current control chargers and constant voltage control chargers, but eliminates their disadvantages. Thus, the battery terminal voltage is compared with a standard voltage, and as above explained, if the battery voltage drops below the standard by a predetermined amount, the charger is cut in. When the charging current builds the voltage up above a predetermined standard, the charger is cut off. Then, as the battery voltage floats down, the charger is reconnected. Accordingly, the "on" impulses will be long when the battery is low, becoming progressively shorter and the "off" cycles longer as the charge builds up since the rate at which the voltage builds up is a function of the state of charge. This operation meets the need of nickel-cadmium batteries by providing sufficient "off" time when the battery is fully charged to allow the catalyst to do its work by recombining the electrolyzed gases back into water, thus avoiding loss of water and other problems of overcharging.

The charger embodying the invention is primarily suitable for charging nickel-cadmium batteries, but may be used on lead acid batteries too by merely resetting the adjustments to suit the characteristics of this type of battery.

It will be understood that modifications and variations may be effected without departing from the scope of the novel concepts of the present invention, but it is understood that this application is to be limited only by the scope of the appended claims.

The invention is hereby claimed as follows:

1. A battery charger comprising a variable voltage alternating current input circuit, a direct current output circuit having positive and negative battery terminals for connecting a battery therein, means for supplying rectified current from said alternating current input circuit to said direct current output circuit, electronic network means operable in said direct current output circuit for comparing the voltage of the battery with a standard voltage and for opening and closing the alternating current input circuit between full battery charge condition and a predetermined amount less than full battery charge condition, and means for producing a steady direct current output from a varying alternating current input, said producing means including a saturable reactor having load windings in said alternating current input circuit and a control winding in said direct current output circuit.

2. A battery charger comprising a variable voltage alternating current input circuit, a direct current output circuit having positive and negative battery terminals for connecting a battery therein, means for supplying rectified current from said alternating current input circuit to said direct current output circuit, electronic network means operable in said direct current output circuit for comparing the voltage of the battery with a standard voltage and for opening and closing the alternating current input circuit between full battery charge condition and a predetermined amount less than full battery charge condition, and means for producing a steady direct current output from a varying alternating current input, said producing means including a saturable reactor having load windings in said alternating current input circuit and a control winding in said direct current output circuit, said producing means also having a potentiometer in series with said control winding for adjusting the charging current.

3. A battery charger comprising an alternating current input circuit, a direct current output circuit having positive and negative battery terminals for connecting a battery therein, means for supplying rectified current from said alternating current input circuit to said direct current output circuit, and electronic network means operable in said direct current output circuit for comparing the voltage of the battery with a standard voltage and for opening and closing the alternating current input circuit between full battery charge condition and a predetermined amount less than full battery charge condition, said network operating a relay having contacts in the alternating current input circuit, said electronic network including a first transistor of the n-p-n type and a second transistor of the p-n-p type each having a collector, an emitter and a base, a resistor connected between the collector of the first transistor and the common terminal of the base of the second transistor and a resistor connected to the positive battery terminal, a first shunt current path connected across the battery terminals including a Zener reference diode and a resistor in series, the common terminal of said diode and resistor being connected to the emitter of said first transistor and the uncommon terminals of the diode and resistor being respectively connected to the negative and positive battery terminals, a second shunt current path connected across the battery terminals including first and second resistors and a first potentiometer connected in series, the first resistor being connected between the negative battery terminal and one side of the potentiometer and the second resistor being connected between the positive battery terminal and the other side of the potentiometer, the tap of said potentiometer being connected to the base of said first transistor, a third current path between the base of said first transistor and the negative battery terminal including a resistor and a second potentiometer in series, the second potentiometer being connected to the negative battery terminal through a diode and the resistor being connected to the transistor base, a conductor connecting the common terminal of the second potentiometer and diode with a common terminal of said relay and the collector of said second transistor, the other terminal of said relay being connected to the negative battery terminal, and a diode connected between the emitter of said second transistor and the positive battery terminal.

4. The combination as defined by claim 3, and a relay in said alternating current input circuit having contacts in said direct current output circuit.

5. A battery charger comprising an alternating current input circuit, a direct current output circuit having positive and negative battery terminals for connecting a battery therein, means for supplying rectified current from said alternating current input circuit to said direct current output circuit, electronic network means operable in said direct current output circuit for comparing the voltage of the battery with a standard voltage and for opening and closing the alternating current input circuit between full battery charge condition and a predetermined amount less than full battery charge condition, and a relay the actuating coil of which is in the direct current output circuit responsive to the connection of a battery across the battery terminals and having contacts in the alternating current input circuit to close said contacts upon energization of said relay.

6. A battery charger comprising an alternating current input circuit, a direct current output circuit having positive and negative battery terminals for connecting a battery therein, means for supplying rectified current from said alternating current input circuit to said direct current output circuit, electronic network means operable in said direct current output circuit for comparing the voltage of the battery with a standard voltage and for opening and closing the alternating current input circuit between full battery charge condition and a predetermined amount less than full battery charge condition, and a relay in said alternating current input circuit having contacts in said direct current output circuit to close said contacts upon energization of said relay.

7. A battery charger comprising an alternating current input circuit, a direct current output circuit having positive and negative battery terminals for connecting a battery therein, means for supplying rectified current from said alternating current input circuit to said direct current output circuit, electronic network means operable in said direct current output circuit for comparing the voltage of the battery with a standard voltage and for opening and closing the alternating current input circuit between full battery charge condition and a predetermined amount less than full battery charge condition, said network operating a relay having contacts in the alternating current input circuit, and a relay in said alternating current input circuit having contacts in said direct current output circuit to close said contacts upon energization of said relay.

8. A battery charger comprising an alternating current input circuit, a direct current output circuit having positive and negative battery terminals for connecting a battery therein, means for supplying rectified current from said alternating current input circuit to said direct current output circuit, electronic network means operable in said direct current output circuit for comparing the voltage of the battery with a standard voltage and for opening and closing the alternating current input circuit between full battery charge condition and a predetermined amount less than full battery charge condition, said network operating a relay having contacts in the alternating current input circuit, a relay in said alternating current input circuit having contacts in said direct current output circuit to close said contacts upon energization of said relay, and a relay in the direct current output circuit responsive to a battery connected across the battery terminals and having contacts in the alternating current input circuit to close said contacts upon energization of said relay.

References Cited by the Examiner
UNITED STATES PATENTS

| 2,013,618 | 9/35 | Woodbridge | 320—40 |
| 2,675,515 | 4/54 | Blashfield | 320—39 X |
| 2,978,633 | 4/61 | Medlar. | |
| 2,979,650 | 4/61 | Godshalk et al. | |
| 3,062,998 | 11/62 | Medlar. | |
| 3,107,318 | 10/63 | Lytle | 317—13 |
| 3,159,123 | 12/64 | Godwin | 200—61.18 |

MAX L. LEVY, *Primary Examiner.*

ROBERT L. SIMS, *Examiner.*